Jan. 20, 1953 W. K. FELL ET AL 2,626,290
PROCESS FOR POLYMERIZING OLEFINS WITH
A PHOSPHORIC ACID SLURRY CATALYST
Filed March 30, 1950 2 SHEETS—SHEET 1

William K. Fell
John D. Leslie  Inventors
By W. O. Heilman  Attorney

Jan. 20, 1953 W. K. FELL ET AL 2,626,290
PROCESS FOR POLYMERIZING OLEFINS WITH
A PHOSPHORIC ACID SLURRY CATALYST
Filed March 30, 1950 2 SHEETS—SHEET 2

William K. Fell
John D. Leslie Inventors
By W. O. J. Heilman Attorney

Patented Jan. 20, 1953

2,626,290

UNITED STATES PATENT OFFICE 2,626,290

PROCESS FOR POLYMERIZING OLEFINS WITH A PHOSPHORIC ACID SLURRY CATALYST

William K. Fell, Elizabeth, and John Duncan Leslie, Cranford, N. J., assignors to Standard Oil Development Company, a corporation of Delaware Application March 30, 1950, Serial No. 152,858

11 Claims. (Cl. 260—683.15)

The present invention relates to the polymerization of olefins, and more particularly to the polymerization of normally gaseous olefins to liquid hydrocarbons comprising essentially aliphatic polymers or copolymers suitable for use in the manufacture of motor fuel.

According to one aspect, the present invention relates to the polymerization of a mixed olefin feed, containing for example, ethylene, propylene and butylene by contacting these gases with a polymerizing catalyst while agitating at temperatures in the range of 350°-600° F. and pressures above those required to condense the gases at the critical temperature, i. e. pressures above the critical.

The manner in which the present process is carried out will be fully understood from the following description when read with reference to the accompanying drawings wherein.

Figure 1:
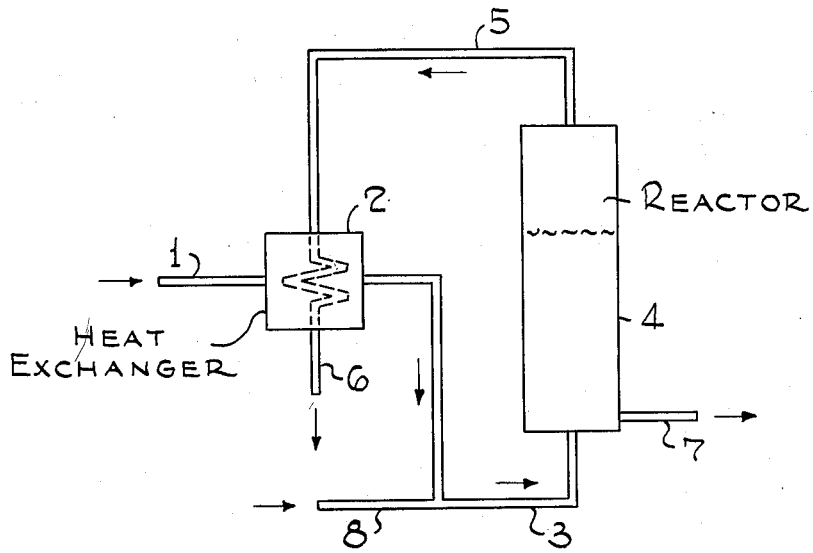
Figure 1 is a diagrammatic flow drawing illustrating one embodiment of this invention in which the catalyst is maintained in suspension by means of feed flowing upwardly therethrough.

In one specific embodiment, the present invention comprises a process for the production of normaly liquid hydrocarbons from a normally gaseous olefin fraction comprising propylene and butylene by passing the normally gaseous olefin fraction upwardly through a finely divided polymerization catalyst (140-200 mesh) at a temperature between 350 and 600° F., superatmospheric pressure of about 1000 lbs./sq. in. or more and at a velocity of one to two feet per minute. By operating in this manner, the olefin fraction is thoroughly mixed with the catalyst which is kept in suspension in the material being polymerized. The pressure is kept above the critical to avoid at any time the coexistence of a gaseous and liquid state. At these temperatures and pressures the olefins are in that nebulous state wherein it is difficult to determine whether the material is liquid or gaseous, the change from one to the other occurring gradually and without discontinuity. It follows, therefore, that at any given time the mixture of olefins and finely divided catalyst may be called either a slurry or a fluidized mass, the change from one to the other not being perceptible, although both states are not present simultaneously.

According to another embodiment of the invention, the catalyst is maintained in suspension in the olefins by mechanical agitation instead of by the flow of the olefin fluid.

According to still another embodiment of the invention, the olefins are preheated and compressed and mixed with a slurry of the catalyst in a heavy oil and passed through a polymerization zone. Products, catalyst and heavy oil are passed together to a disengaging drum where product is separated overhead and the slurry of catalyst in heavy oil is separated and recycled to the reaction zone.

As an essential feature of this invention the olefin polymerization must be conducted in the presence of a finely divided adsorbent material in addition to the catalyst. When the process was carried out in the absence of an adsorbent, fluidization was not obtained even at fluid velocities of 5 feet per minute and the catalyst was found to have agglomerated in lumps. However, by operating in the presence of catalyst mixed with 10-50% of finely divided silica gel excellent fluidization was obtained at fluid velocities of 1.5 feet per minute and the catalyst did not agglomerate.

The finely divided adsorbent may suitably comprise any adsorbent material such as silica gel, bauxite, activated alumina, etc., but silica gel is preferred.

The catalyst which has been found suitable for this process comprises a composite of phosphoric acid on kieselguhr or silica gel. The phosphoric acid may be present in amounts between 50 and 90% and may be promoted with 1 to 5% nickel or copper phosphate. One suitable composition consists of 78% phosphoric acid supported on 20% silica gel and promoted with 2% nickel phosphate activated at a temperature between 500 and 800° F.

The invention will be further explained in connection with the accompanying diagrammatic flow drawings which illustrate several specific embodiments of the invention, but not with the intention of unduly limiting the same.

Referring to Figure 1, a normally gaseous $C_3$, $C_4$ hydrocarbon fraction containing 50% paraffins and 50% olefins, the latter consisting of 50% propylene and 50% butylene, is introduced at 100° F. and about 125 lbs./sq. in. gage by line 1 to heat exchanger 2 where it is heated to 250° F. The heated feed is then introduced by line 3 into the bottom of reaction zone 4 maintained under 1000 lbs./sq. in. gage pressure and at a temperature of 450° F. The reaction zone contains a finely divided catalyst consisting of phosphoric acid deposited on kieselguhr of about 140–200 mesh. The feed is introduced upwardly through this catalyst at about 1 to 2 feet per minute so that the catalyst is maintained in suspension in the feed. Thus the more dense catalyst particles will lag behind the less dense olefins and the catalyst will concentrate in the lower portion of the reaction zone in a dense phase mass which acts as if it had a level similar to a boiling liquid. However, the conditions are set within the reaction zone so that actually there is only one fluid phase present. These conditions are preferably near the critical temperature and pressure for a 50:50 mixture of polymer and $C_3$, $C_4$ components but outside the region in which two fluid phases appear. Pressures of about 1000 lbs./sq. in. gage in the reaction zone have been found suitable to maintain this single phase.

There is very little catalyst if any above the psuedo level within the reactor and little or no catalyst entrainment occurs.

As pointed out above, it is necessary to maintain an additional adsorptive agent in the reaction zone to prevent agglomeration of the catalyst. Accordingly, there is interdispersed with the catalyst about 10–50% by weight of finely divided silica gel of from 140–200 mesh. This silica gel does not contain any catalyst deposited on it and presumably acts to adsorb solid or high boiling polymers formed initially, although this invention is not intended to be limited by any theory as to the action of the silica gel.

The proper state of hydration of the catalyst, if necessary, may be maintained by the introduction of regular quantities of water. This is not illustrated in the drawing but may readily be accomplished by well known means.

The products from zone 4, boiling for the most part in the motor fuel boiling range, are removed, substantially free from catalyst, by line 5 and passed through heat exchanger 2 where they give up heat to incoming feed. The cooled products are then passed by line 6 to any desired fractionating or stabilizing means, not shown.

From time to time catalyst is removed from reaction zone 4 through line 7 and burned or otherwise disposed of. Makeup catalyst is added by line 8. The process is thus non-regenerative.

Figure 2:
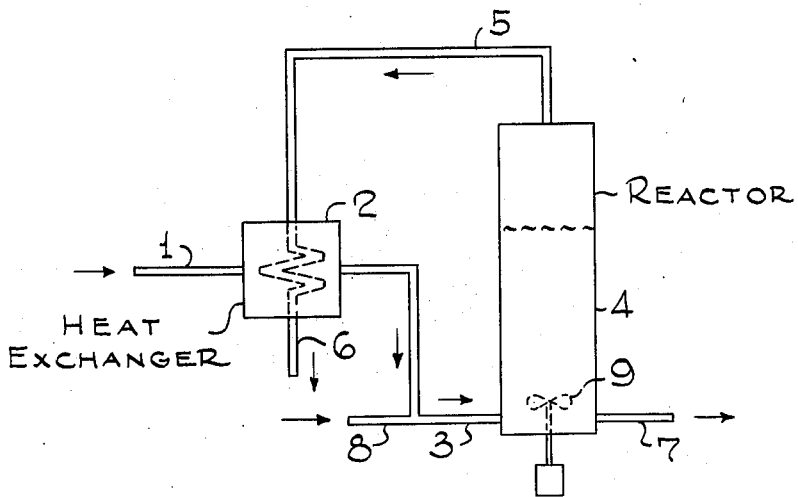
Figure 2 represents another embodiment of the invention in which the catalyst is maintained in suspension by means of mechanical agitation.

In order to maintain a more positive agitation of the fluidized catalyst in the reaction zone 4, and to permit greater flexibility in feed rates, a mechanical stirring device may be used, as for example, agitator 9 shown in Figure 2. The operation of the apparatus in Figure 2 is otherwise the same as in Figure 1.

Figure 3:
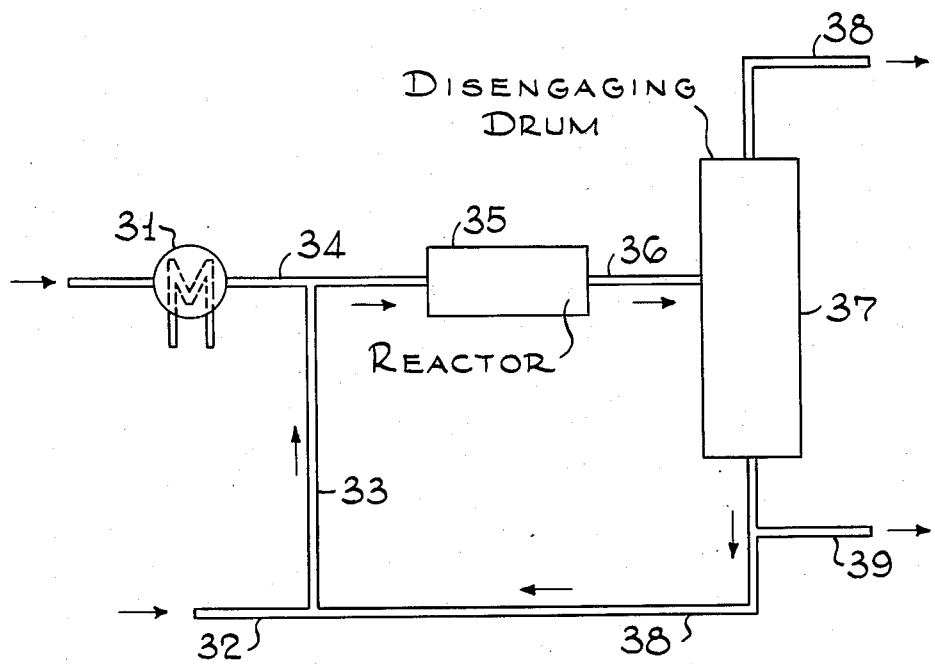
Figure 3 represents an embodiment of the invention in which the catalyst is maintained as a slurry in a heavy oil and the slurry is recycled to the reaction zone.

A somewhat different embodiment of the invention is shown in Figure 3. According to this embodiment the propylene-butylene-paraffin mixture is passed through line 30 to preheater 31 where it is heated to 470° F. and compressed to 1000 lbs./sq. in. gage. The preheated and compressed feed is slurried with finely divided phosphoric acid catalyst on kieselguhr mixed with 10–50% by weight of finely divided silica gel flowing through lines 32 and 33. The catalyst and silica gel are preferably slurried with a high boiling hydrocarbon oil to enable them to be easily passed through the equipment lines. The mixture of olefins, catalyst, and silica gel are then passed by line 34 to reaction zone 35 where they are maintained in contact for a sufficient length of time at about 470° F. and about 1000 lbs. to convert the feed into the desired motor fuel product. The mixture of unreacted olefins, catalyst, silica gel and product are passed by line 36 to disengaging drum 37 where the pressure is reduced to 75 lbs./sq. in. gage. As a result of the reduction in pressure the products are vaporized and pass overhead through line 38 for further treatment as desired. Catalyst, and silica gel, slurried in the high boiling hydrocarbon oil are removed from disengaging drum 37 by line 38 and recycled to the reactor through lines 33 and 34. From time to time a small amount of catalyst may be removed from the system through line 39. Fresh catalyst and silica gel are added to the system through line 32.

Reaction zone 35 may be a fired coil or it may be an enlarged chamber or drum.

The following examples are introduced for the purpose of further illustrating the invention but not with the intention of limiting the same.

EXAMPLE 1

A normally gaseous mixture of 25% by weight of propylene, 25% by weight of butene-2 and 50% by weight of propane was passed upwardly through a finely divided (140–200 mesh) catalyst consisting of phosphoric acid on kieselguhr at a temperature ranging between 375 and 450° F. and under 1000 lbs./sq. in. gage and velocities up to 5 feet per minute. No fluidization or slurry formation occurred. Bumping and motion in the top layer of catalyst were noted at the start. After several hours operation the catalyst was removed and found to be slightly sticky to touch and darkened in color. In some cases agglomerated lumps were found and the interiors of these were almost black.

EXAMPLE 2

An experiment similar to that in Example 1 was carried out using a mixture of 20% by weight of propylene and 80% of propane. In this case good fluidization was obtained at temperatures as low as 100°–150° F. and velocities as low as 1.5 feet/minute. This fluidization was maintained even when the temperature was raised to 400° F. When the feed was switched over to that used in Example 1, the bed settled down within a few seconds and a velocity of 6 feet/minute did not fluidize it.

EXAMPLE 3

An experiment similar to all respect to Experiment 1 was carried out, except that the catalyst was diluted with an equal weight of silica gel of the same particle size. In this experiment good fluidization was realized at a velocity of 2.5 feet/minute through the reactor. In another experiment using 85% catalyst and 15% silica gel, excellent fluidization was obtained at a reactor velocity of 1.0 feet/minute. In this case the bed expansion amounted to 25% and fluidity was maintained for several hours without any indication of agglomeration. In a third experiment with the same catalyst and feed as in Example 1 but using 35% sand, poor fluidization was obtained at velocities up to 5 feet/minute.

EXAMPLE 4

Two series of runs were made in a high pressure stirred autoclave, one with a phosphoric acid catalyst on kiseleguhr and the other with the same catalyst diluted with 20 weight percent silica gel. Pressures were maintained between 960 and 1000 lbs./sq. in gage and space velocities varied from 0.2 to 0.7 gal./hr./lb. of catalyst. In the first series of runs the feed stock was propane plus either propylene alone or propylene and butene-2 in the ratio of 2/1. After 19 hours, the reactor was opened and the catalyst found to be caked and agglomerated and non-uniformly darkened in color. The results are tabulated in Table 1:

TABLE 1
*Slurry polymerization in stirred reactor*

60–80 MESH PHOSPHORIC ACID CATALYST; 1000 P. S. I. G.; 200 R. P. M.

[$C_3$—28 weight percent propylene in propane; $C_3$–$C_4$—45 weight percent propylene+butene-2 in propane.]

| Time on stream (hrs.) | Temp. (° F.) | Space vel. (gal./hr./lb. catalyst) | Polymer yield (weight percent on olefin) | Type of feed | Octane No. clear CFRR |
|---|---|---|---|---|---|
| 3–4 | 350 | 0.56 | 33.2 | $C_3$ | |
| 4–5 | 365 | .48 | 39.4 | $C_3$–$C_4$ | 94.8 |
| 6–7 | 370 | .51 | 36.0 | $C_3$–$C_4$ | 95.5 |
| 7–8 | 385 | .28 | 34.8 | $C_3$–$C_4$ | 95.7 |
| 10–11 | 378 | .55 | 39.4 | $C_3$ | 94.5 |
| 13–14 | 350 | .76 | 31.0 | $C_3$ | 93.3 |

Carbon after 20 hours: 1.75 wt. percent on catalyst, 0.38 wt. percent on polymer.

In the second series, the feed stock was a $C_4$ cut containing 36.0 weight percent of olefin of which about ⅓ was isobutylene. After 60 hours of operation the catalyst was examined and found to be in good condition; no lumping was visible and the color was uniform. After flushing the catalyst with cold feed until the bed temperature had dropped to 200° F., the operation was continued for another 67 hours. The catalyst still showed no signs of serious agglomeration. The results of these are summarized in the following table:

TABLE 2
*Slurry polymerization in stirred reactor*

[80 weight percent 60–80 mesh phosphoric acid catalyst +20 weight percent 60–80 mesh silica gel; 1,000 p. s. i. g.; 200 R. P. M.; $C_4$ feed containing 36–40 weight percent olefin.]

| Time on stream (hrs.) | Temp. (° F.) | Space vel. (gal./hr./lb. catalyst) | Polymer yield (weight percent on olefin) | Olefin conversion (weight percent) | Octane No. clear ASTM | CFRR |
|---|---|---|---|---|---|---|
| 2–6 | 419 | 0.25 | 93.5 | 85 | 83.3 | 98.6 |
| 6–10 | 422 | .25 | 96.0 | | 83.3 | 97.7 |
| 11–15 | 418 | .25 | 86.8 | | 82.8 | 98.4 |
| 22–26 | 419 | .48 | 80.0 | | 83.9 | 98.7 |
| 26–30 | 418 | .46 | 79.2 | | 84.0 | 98.8 |
| 30–41 | 419 | .36 | 71.4 | 75.8 | 82.9 | 98.7 |
| 41–46 | 418 | .30 | 78.2 | 76.5 | 84.8 | 98.6 |
| 46–56 | 416 | .60 | 61.2 | 61.8 | 83.1 | 99.2 |
| 70–74 | 442 | .40 | 56.8 | 51.4 | 83.5 | 98.7 |
| 84–88 | 434 | .65 | 46.0 | | | |
| 91–95 | 442 | .24 | 56.8 | | 84.0 | 98.7 |
| 104–108 | 440 | .39 | 45.0 | 44.0 | 82.9 | 98.7 |
| 110–115 | 443 | .31 | 41.0 | | 83.1 | 99.8 |
| 116–120 | 447 | .40 | 42.8 | 39.6 | | |

Carbon after 60 hours: 2.0 weight percent on catalyst, 0.07 weight percent on polymer. Carbon after 130 hours: 2.9 weight percent on catalyst, 0.05 weight percent on polymer.

The nature of the present invention having been thus fully set forth and specific examples of the same given, what is claimed as new and useful and desired to be secured by Letters Patent is:

1. A non-regenerative catalytic process for polymerizing olefins which comprises the steps of forming in a reaction zone an agitated co-suspension of finely divided catalyst comprising phosphoric acid deposited on a solid carrier and finely divided solid diluent in fluid hydrocarbon, continuously contacting said suspension with olefin feed at polymerization temperature and pressure, and continuously withdrawing effluent including polymerized olefins from said zone while maintaining said catalyst and diluent in said suspension within said zone, said solid diluent being selected from the class consisting of silica gel, bauxite and alumina and being used in an amount in the range of 10 to 50% by weight, based on said catalyst, whereby substantial agglomeration of said catalyst is prevented.

2. A process in accordance with claim 1 wherein said suspension is formed by passing said olefin upwardly through said catalyst and diluent.

3. A process in accordance with claim 1 wherein said suspension is formed by mechanically agitating said olefins, catalyst, and diluent.

4. A process in accordance with claim 1 wherein said catalyst and said solid diluent have particle sizes in the range of 60 to 200 mesh.

5. A non-regenerative catalytic process for polymerizing normally gaseous olefins which comprises the steps of forming in a reaction zone an agitated suspension of finely divided catalyst comprising phosphoric acid deposited on kieselguhr in fluid hydrocarbon, said suspension including in the range of 10 to 50% by weight, based on the catalyst, of finely divided silica gel diluent interdispersed therewith whereby substantial agglomeration of said catalyst is prevented, continuously passing olefin feed into contact with said suspension while maintaining said reaction zone at a temperature in the range of 350° to 600° F. and a pressure above the critical for the hydrocarbons, continuously removing substantially solid-free effluent including polymerized olefins from said zone while maintaining said catalyst and diluent in said suspension within said zone, and removing spent catalyst from said zone and replacing it with make-up catalyst as needed.

6. A process in accordance with claim 5 wherein said suspension is formed by passing said olefin upwardly through said catalyst and silica gel.

7. A process in accordance with claim 5 wherein said suspension is formed by mechanically agitating said olefins, catalyst, and silica gel.

8. A process in accordance with claim 5 wherein said catalyst and silica gel have particle sizes in the range of 60 to 200 mesh.

9. The process for polymerizing olefins which comprises the steps of forming a slurry comprising a finely divided catalyst comprising phosphoric acid deposited on a solid carrier and finely divided solid diluent interdispersed in a heavy oil, and mixing the olefins with said slurry under polymerization conditions, said diluent being selected from the class consisting of silica gel, bauxite and activated alumina.

10. The process for polymerizing normally gaseous olefins which comprises the steps of forming a slurry comprising a finely divided catalyst comprising phosphoric acid deposited on a solid carrier and in the range of 10 to 50% by weight, based on said catalyst, of finely divided silica gel interdispersed in a heavy oil, and mixing the olefins with said slurry at a temperature in the range of about 350° to 600° F. and at a polymerization pressure, whereby substantial agglomeration of the catalyst is avoided.

11. Process for polymerizing olefins which comprises mixing in a mixing zone the olefins with a slurry in a heavy oil of a finely divided catalyst comprising phosphoric acid deposited on a solid carrier and a finely divided solid diluent for the catalyst comprising silica gel, passing the mixture of olefins, catalyst, diluent and oil through a reaction zone under polymerizing conditions at temperatures between 350° and 600° F. and pressures above the critical, removing polymerization products, catalyst, diluent and oil from the reaction zone, separating the polymerization products from the catalyst, diluent and oil and recycling the catalyst with diluent and oil to the mixing zone.

WILLIAM K. FELL.
JOHN DUNCAN LESLIE.

REFERENCES CITED

The following references are of record in the file of this patent:

UNITED STATES PATENTS

| Number | Name | Date |
|---|---|---|
| 2,293,353 | Moravec et al. | Aug. 18, 1942 |
| 2,354,261 | Hemminger | July 25, 1944 |
| 2,393,909 | Johnson | Jan. 29, 1946 |
| 2,397,945 | Burney et al. | Apr. 9, 1946 |
| 2,446,619 | Stewart et al. | Aug. 19, 1948 |
| 2,453,874 | Sweetser | Nov. 16, 1948 |
| 2,459,444 | Main | Jan. 18, 1949 |
| 2,459,836 | Murphree | Jan. 25, 1949 |